US007639283B1

(12) United States Patent
Jaspers

(10) Patent No.: US 7,639,283 B1
(45) Date of Patent: *Dec. 29, 2009

(54) COLOR SIGNAL MATRIX ADJUSTMENT

(75) Inventor: Cornelis A. M. Jaspers, Eindhoven (NL)

(73) Assignee: IPG Electronics 503 Limited, St. Peter Port (GG)

( * ) Notice: Subject to any disclaimer, the term of this patent is extended or adjusted under 35 U.S.C. 154(b) by 0 days.

This patent is subject to a terminal disclaimer.

(21) Appl. No.: 09/372,459

(22) Filed: Aug. 11, 1999

(30) Foreign Application Priority Data

Aug. 14, 1998 (EP) .................................. 98202727

(51) Int. Cl.
*H04N 9/73* (2006.01)
(52) U.S. Cl. .................... 348/223.1; 348/272; 348/273; 348/280; 382/167; 382/274
(58) Field of Classification Search ................ 382/167, 382/274; 348/659–670, 649, 223.1, 221.1, 348/222.1, 272, 273, 280, 655; 358/516, 358/518, 515
See application file for complete search history.

(56) References Cited

U.S. PATENT DOCUMENTS

| | | | | |
|---|---|---|---|---|
| 3,652,787 A | * | 3/1972 | Tkacenko | .................... 348/655 |
| 3,689,689 A | * | 9/1972 | Weitzsch | .................... 348/661 |
| 4,553,141 A | * | 11/1985 | Flasza et al. | .................... 345/22 |
| 4,605,954 A | * | 8/1986 | Bestenreiner et al. | ........ 348/645 |
| 4,679,072 A | * | 7/1987 | Takayama | .................... 358/520 |
| 4,706,108 A | * | 11/1987 | Kumagai et al. | ............ 348/178 |
| 4,788,586 A | * | 11/1988 | Eckenbrecht | ............... 348/649 |
| 5,237,400 A | * | 8/1993 | Washio et al. | ............... 358/518 |
| 5,258,829 A | * | 11/1993 | Matsunaga et al. | .......... 348/659 |
| 5,327,226 A | | 7/1994 | Tanabe | |
| 5,345,275 A | * | 9/1994 | Lendaro | ..................... 348/656 |
| 5,402,182 A | | 3/1995 | Sugiura | |
| 5,428,402 A | * | 6/1995 | Van Rooij | .................... 348/649 |
| 5,499,059 A | * | 3/1996 | Skinner | .................... 348/645 |
| 5,585,844 A | | 12/1996 | Hieda et al. | |
| 5,654,809 A | * | 8/1997 | Beeman et al. | ............. 358/504 |
| 5,677,741 A | * | 10/1997 | Yui | ............................ 348/649 |
| 6,025,885 A | * | 2/2000 | Deter | .......................... 348/661 |
| 6,091,848 A | * | 7/2000 | Yamamoto | ................... 382/162 |
| 6,229,580 B1 | * | 5/2001 | Inoue | .......................... 348/649 |
| 6,269,184 B1 | * | 7/2001 | Spaulding et al. | ........... 382/167 |
| 6,552,751 B1 | * | 4/2003 | Shigeta | ....................... 348/659 |

FOREIGN PATENT DOCUMENTS

EP         0533488 A2    3/1993

* cited by examiner

*Primary Examiner*—Yogesh K Aggarwal
(74) *Attorney, Agent, or Firm*—Volpe and Koenig PC

(57) ABSTRACT

In a color signal matrix adjustment method, a single first color signal matrix related value is adjusted (VAC) to obtain a color signal matrix adjustment, and at least two color signal matrix parameters other than the single first color signal matrix related value are automatically adapted (AAC) in dependence upon the color signal matrix parameter adjustment.

3 Claims, 1 Drawing Sheet

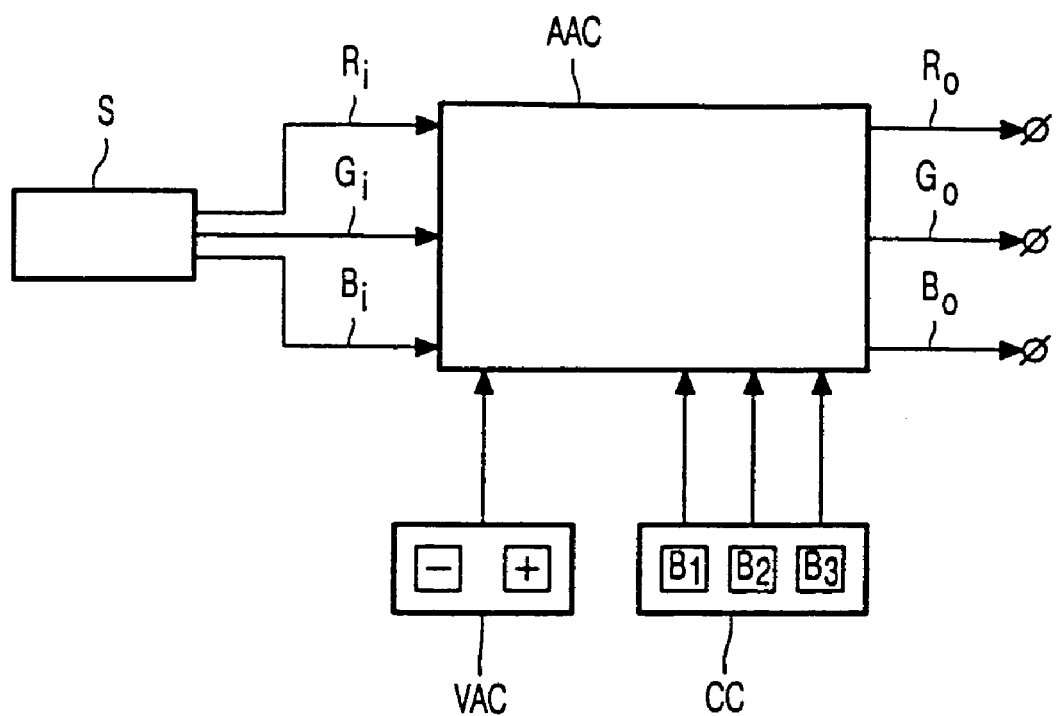

COLOR SIGNAL MATRIX ADJUSTMENT

The invention relates to a method of and device for a color signal matrix adjustment, and to a color camera comprising such a color signal matrix adjustment device.

Every color sensor needs a correction of its given colors towards the EBU Red-Green-Blue primaries which are accustomed in worldwide television sets and PC monitors. For the color correction a matrix with nine variables is applied. The RGB color matrix serves in the following equation:

$$\begin{bmatrix} Ro \\ Go \\ Bo \end{bmatrix} = \begin{bmatrix} a11 & a12 & a13 \\ a21 & a22 & a23 \\ a31 & a32 & a33 \end{bmatrix} \times \begin{bmatrix} Ri \\ Gi \\ Bi \end{bmatrix}$$

Herein, Ri, Gi, Br are the input RGB signals of the image sensor, Ro, Go, Bo are the output RGB signals which are close to the EBU primaries or otherwise more desired (e.g. in that the picture just looks nicer) than the input RGB signals, and a11 ... a33 are the color signal matrix parameters, viz. a11 ... a13 for Red, a21 ... a23 for Green, and a31 ... a33 for Blue.

If one of the color signal matrix parameters a11 ... a33 is changed to obtain a desired change in one output color, also the white reproduction will be changed as an undesired side-effect. This makes a manual adjustment of the output colors very difficult and time consuming.

Besides the desired correction of RGB colors, commonly also the white point of the image generated by the sensor has to be corrected. The white reproduction depends on the RGB spectral power distribution of the sensor itself and of the color temperature of the scene illumination. That white reproduction has to be adjusted to D65 or close to D65 white of the EBU display standard. The white reproduction via the color signal matrix is represented by the sum of the matrix variables of each color:

$\Sigma R = a11+a12+a13$
$\Sigma G = a21+a22+a23$
$\Sigma B = a31+a32+a33$

It is however almost impossible to change the three selected matrix parameters of one color proportionally in order to achieve a desired white point.

U.S. Pat. No. 5,402,182 discloses an automatic white balance controlling apparatus for controlling the white balance of an image screen by controlling the color signal level in accordance with an up-down counting result in a micro-computer.

It is, inter alia, an object of the invention to provide a very simple matrix adjustment. To this end, a first aspect of the invention provides a method and a device as defined by claims 1 and 5. A second aspect of the invention, defined by claim 6, provides a color camera comprising such a matrix adjustment device. Advantageous embodiments are defined in the dependent claims.

In a color signal matrix adjustment method in accordance with a primary aspect of the invention, only a single first color signal matrix related value is adjusted to obtain a desired color signal matrix adjustment, and at least two color signal matrix parameters other than the single first color signal matrix related value are automatically adapted in dependence upon the color signal matrix parameter adjustment.

These and other aspects of the invention will be apparent from and elucidated with reference to the embodiments described hereinafter.

The drawing shows an embodiment of a color camera in accordance with the present invention.

In accordance with a preferred embodiment of the present invention, the desired white and RGB color adjustment can much easier be achieved with the aid of a RISC core (or any other kind of computing power) in the camera, and with the above-mentioned color signal matrix formulas.

A primary application of the invention relates to a color signal matrix adjustment with the aid of RISC core. There are four possibilities for adjusting the matrix to the desired colors. The selection of a possibility, and switching from one to another and back, depends on the way of adjustment and fine-tuning by the user.

1. The conventional method by changing one matrix parameter at a time.
2. Changing one matrix parameter at a time, but with maintenance of the white reproduction to a large extent in accordance with a first aspect of the present invention.
3. For white adjustment, three matrix parameters can be changed simultaneously.
4. For white amplitude adaptation, all nine matrix parameters can be changed proportionally to each other.

The first possibility needs of course no further explanation. The selected color as well as the white reproduction will change.

The second possibility, offering the maintenance of the white reproduction to a large extent by selecting first a Boolean B1 to distinguish it from the first possibility, uses the calculation power of a RISC core. If one matrix parameter of a color X is changed with a value $\pm\delta$, then all six matrix parameters not belonging to the selected color X (i.e. those in the two other rows), are multiplied by $(\Sigma X \pm \delta)/\Sigma X$, where $\Sigma X$ corresponds with the selected Red, Green or Blue matrix row sums. After that new $\Sigma R$, $\Sigma G$ and $\Sigma B$ values are calculated. They will be proportional to the previous values before the adjustment, so the white reproduction will be maintained to a large extent. White is fully maintained if the $\Sigma R$, $\Sigma G$ and $\Sigma B$ values are equal to 1; a slight white shift occurs if the $\Sigma R$, $\Sigma G$ and $\Sigma B$ values differ from 1. However, this slight white shift can easily be corrected in accordance with the third possibility described below.

In accordance with the third and fourth possibilities, the white reproduction is changed with maintenance of the ratio of the matrix parameters for each color.

The third possibility, indicated by a second Boolean B2, concerns the adjustment of the white reproduction with only one single parameter, again with the aid of a RISC core. If the white reproduction has to be changed, one of the $\Sigma R$, $\Sigma G$ or $\Sigma B$ matrix row sums is selected and changed. The RISC core takes care of a proportionally change of the corresponding matrix parameters. For example, if $\Sigma R$ is increased by $\pm\delta$, then the matrix parameters a11, a12 and a13 are each multiplied by $(\Sigma R \pm \delta)/\Sigma R$, finally resulting in a desired white shift. The direction of the color vector for Red will get a small deviation that is determined by the amount of white shift only.

The fourth possibility, again using a RISC core, concerns the adjustment of all matrix parameters proportionally to each other in order to adapt the signal amplitude of the matrix circuit to a more unity value. Select first a Boolean B3 that makes clear that all parameters have to be changed proportionally. Then select one of the $\Sigma R$, $\Sigma G$ or $\Sigma B$ matrix row sums. Vary this matrix row sum by ±δ. Next all matrix parameters will be multiplied by (ΣX±δ)/ΣX, where ΣX corresponds with the selected ΣR, ΣG or ΣB matrix row sum. Thereafter, the new ΣR, ΣG and ΣB matrix row sums are calculated again. The color as well as the white reproduction will be maintained, only the signal amplitudes will be changed.

The following conclusions can be drawn. Using all proposed possibilities will help to adjust the matrix much easier then when using only the first possibility. All mentioned adjustment possibilities have been realized with a PC and a menu for the selection of the matrix parameters a11 to a33, ΣR, ΣG or ΣB and two Boolean, one for white maintenance and one for amplitude adjustment.

A primary aspect of the invention can be summarized as follows. Besides the theoretical calculation of the matrix for color correction, also a manual adjustment for further fine-tuning or as a check with several pictures is required. Tuning the color matrix of a camera to a desired color reproduction means however that nine parameters have to adjusted. A specific problem with such a matrix is that if one parameter, in for instance the red matrix, is changed that besides the red also the white reproduction changes. By maintaining the white reproduction with the aid of the calculation power of the RISC core (Reduced Instruction Set Computer) of the camera it has become much easier to adjust the matrix to the desired color reproduction. Moreover it is also possible to change directly the white reproduction. The deviation of the color reproduction will then be determined by the deviation of the white reproduction only.

The following features are especially noteworthy. The possibility of maintaining the white reproduction when changing one of the selected matrix parameters a11 to a33. Changing the white reproduction by selection of ΣR, ΣG or ΣB with maintenance of the matrix ratio of each color and with a color shift that is only determined by the amount of white shift. The proportional adaptation of the signal amplitudes by changing all matrix parameters proportionally to each other by selecting an amplitude Boolean and ΣR, ΣG or ΣB. The use of a computing processor like a RISC core for the previously mentioned features.

The drawing shows an embodiment of a color camera in accordance with the present invention. A sensor S supplies three input color signals Ri, Bi and Gi. A matrix adjustment device VAC, CC, AAC receiving these input color signals Ri, Bi and Gi comprises a value adjustment circuit VAC for adjusting a color matrix related value which may be one of the nine matrix parameters a11 ... a33 or one of the three matrix row sums ΣR, ΣG or ΣB. A control circuit CC comprises three buttons B1, B2, B3 to switch on or off the three above-mentioned Booleans B1, B2 or B3, respectively. An automatic adapting circuit AAC adapts the matrix parameters as described above with regard to the four above-mentioned possibilities, and supplies the output color signals Ro, Go and Bo.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In the device claim enumerating several means, several of these means can be embodied by one and the same item of hardware.

The invention claimed is:

1. A method of adjusting an n×n color signal matrix used to multiply a column vector input color value, where n is a number of primary colors in a chosen color space, the method comprising:
    adjusting, using a color signal matrix adjustment device, a single first color signal matrix related value; to obtain a color signal matrix adjustment; and
    automatically adapting at least two color signal matrix parameters other than said single first color signal matrix related value in dependence upon said color signal matrix parameter adjustment, wherein:
    said single first color signal matrix related value is a first color signal matrix parameter corresponding to a first color;
    said color signal matrix adjustment is an increase of said first color signal matrix parameter by an amount δ to change a reproduction of said first color; and
    said automatically adapting step includes multiplying all color matrix parameters corresponding to colors other than said first color by a factor (ΣX+δ)/ΣX, in which ΣX is a sum of color signal matrix parameters corresponding to said first color, to substantially maintain a white reproduction.

2. A color camera, comprising a color sensor for producing input color signals and a color signal matrix adjustment device for adjusting an n×n color signal matrix used to multiply a column vector input color value where n is a number of primary colors in a chosen color space, used for adjusting said input color signals to obtain output color signals, wherein the color signal matrix adjustment device includes:
    means for adjusting a single first color signal matrix related value to obtain a color signal matrix adjustment; and
    means for automatically adjusting at least two color signal matrix parameters other than said single first color signal matrix related value in dependence upon said color signal matrix parameter adjustment, wherein:
    said single first color signal matrix related value is a first color signal matrix parameter corresponding to a first color;
    said color signal matrix adjustment is an increase of said first color signal matrix parameter by an amount δ to change a reproduction of said first color; and
    said automatically adapting step includes multiplying all color matrix parameters corresponding to colors other than said first color by a factor (ΣX+δ)/ΣX, in which ΣX is a sum of color signal matrix parameters corresponding to said first color, to substantially maintain a white reproduction.

3. A color signal matrix adjustment device for adjusting an n×n color signal matrix used to multiply a column vector input color value where n is a number of primary colors in a chosen color space, comprising:
    means for adjusting a single first color signal matrix related value to obtain a color signal matrix adjustment; and
    means for automatically adapting at least two color signal matrix parameters other than said single first color signal matrix related value in dependence upon said color signal matrix parameter adjustment, wherein:

said single first color signal matrix related value is a first color signal matrix parameter corresponding to a first color;

said color signal matrix adjustment is an increase of said first color signal matrix parameter by an amount to change a reproduction of said first color; and said automatically adapting step includes multiplying all color signal matrix parameters corresponding to colors other than said first color by a factor $(\Sigma X+\delta)/\Sigma X$, in which $\Sigma X$ is a sum of color signal matrix parameters corresponding to said first color, to substantially maintain a white reproduction.

* * * * *